United States Patent [19]
Kooyker et al.

[11] Patent Number: 5,460,082
[45] Date of Patent: Oct. 24, 1995

[54] KITCHEN MACHINE HAVING A DISPLACEABLE SHAFT END

[75] Inventors: Klaas Kooyker; Adam Weits, both of Hoogeveen, Netherlands

[73] Assignee: U.S. Philips Corporation, New York, N.Y.

[21] Appl. No.: 16,358

[22] Filed: Feb. 11, 1993

[30] Foreign Application Priority Data

Feb. 18, 1992 [EP] European Pat. Off. .............. 92200458

[51] Int. Cl.$^6$ ..................................................... A47J 43/00
[52] U.S. Cl. ................... 99/484; 99/510; 99/511; 366/205
[58] Field of Search ............................ 99/484, 510, 511; 366/205, 314, 601; 248/605, 612, 634

[56] References Cited

U.S. PATENT DOCUMENTS

| | | | |
|---|---|---|---|
| 3,713,628 | 1/1973 | Christensen | 259/108 |
| 5,074,201 | 12/1991 | Takeyama et al. | 99/510 |
| 5,236,135 | 8/1993 | Wilson et al. | 99/510 |

FOREIGN PATENT DOCUMENTS

| | | | |
|---|---|---|---|
| 409335 | 1/1991 | European Pat. Off. . | |
| 2132522 | 8/1972 | France . | |
| 2082713 | 3/1982 | United Kingdom . | |

Primary Examiner—David A. Scherbel
Assistant Examiner—Patrick F. Brinson
Attorney, Agent, or Firm—Ernestine C. Bartlett

[57] ABSTRACT

A kitchen machine is provided having a motor housing (5) on which an attachment (25) with a rotatable tool (33) may be placed, so that the tool (33) is removably attached to an end (35) of a drive shaft (43) which is drivable by an electric motor (23) arranged in the motor housing (5). The end (35) of the drive shaft (43) is self-aligning relative to the motor housing (5) by a displacement parallel to an X-direction transverse to the drive shaft (43) and a displacement parallel to a Y-direction transverse to the drive shaft (43) and the X-direction, so that the end (35) of the drive shaft (43) can align itself with the position of the tool (33) when the attachment (25) is placed in position, and friction losses between the end (35) of the drive shaft (43) and the tool (33) are minimal during operation.

In a special embodiment of the kitchen machine, the movability of the end (35) of the drive shaft (43) is achieved in that the electric motor (23) with the drive shaft (43) is tiltable relative to the motor housing (5) about a first pivot axis (65) directed parallel to the X-direction and a second pivot axis (85) directed parallel to the Y-direction.

22 Claims, 3 Drawing Sheets

KITCHEN MACHINE HAVING A DISPLACEABLE SHAFT END

FIELD OF THE INVENTION

The invention relates to a kitchen machine with a motor housing on which an attachment with a rotatable tool may be placed, which tool may be coupled to an end of a drive shaft which is drivable by an electric motor arranged in the motor housing.

BACKGROUND OF THE INVENTION

A kitchen machine of the kind mentioned in the opening paragraph is known from British Patent Application GB-2,082,713-A. In the known kitchen machine, the attachment is a blender jar and the tool is a blender knife which has its rotation bearings in a bottom portion of the blender jar. The blender jar can be placed on the motor housing, whereby the bottom portion of the blender jar can be locked on the motor housing and the blender knife can be coupled to the end of the drive shaft of the electric motor by means of a coupling bush, said motor being present in the motor housing and fastened to a motor frame. Instead of the blender jar with the blender knife, a transverse arm with a rotating beater may be placed on the motor housing, which beater can be coupled to the end of the drive shaft via a transmission provided in the transverse arm and a coupling bush. The beater in this case is positioned in a bowl which can be placed on a base of the kitchen machine next to the motor housing and rotated by the electric motor.

A disadvantage of the known kitchen machine is that the centerline of the drive shaft and the centerline of the coupling bush of the attachment are not in one line as a result of manufacturing tolerances. As a result, the application of the attachment on and the removal of the attachment from the motor housing may take place with difficulty, while friction losses may occur between the end of the drive shaft and the coupling bush during operation.

SUMMARY OF THE INVENTION

An object of the invention is to provide a kitchen machine of the kind mentioned in the opening paragraph in which the said disadvantages are counteracted as much as possible.

The kitchen machine according to the invention is for this purpose characterized in that the end of the drive shaft is self-aligning relative to the motor housing by means of a displacement parallel to an X-direction directed transverse to the drive shaft and a displacement parallel to a Y-direction which is transverse to the drive shaft and to the X-direction. Since the end of the drive shaft is self-aligning by means of displacements parallel to the X-direction and the Y-direction, the end of the drive shaft will align itself with the position of the attachment when this attachment is provided on the motor housing, so that the end of the drive shaft then assumes an accurate position relative to the attachment and the tool, and a low-friction coupling between the drive shaft and the tool is obtained.

A special embodiment of a kitchen machine according to the invention, in which the self-aligning property of the end of the drive shaft is provided by means of a simple and practical construction, is characterized in that the electric motor with the drive shaft is tiltable relative to the motor housing about a first pivot axis directed parallel to the X-direction and a second pivot axis directed parallel to the Y-direction.

A further embodiment of a kitchen machine according to the invention, in which the motor housing is arranged on a base and the drive shaft extends transverse to the base, while a further attachment with a further tool may be placed on the base, the further tool being rotatable about an axis of rotation directed parallel to the drive shaft and may be coupled to the drive shaft through a transmission arranged in the base, is characterized in that the transmission is fastened to a frame plate which extends in the base and which is tiltable relative to the base about the first pivot axis, while the electric motor is fastened to two parallel frame pins which extend transverse to the frame plate and which are tiltable relative to the frame plate about the second pivot axis. The use of the frame plate and the frame pins provides the pivot axes in a constructionally simple manner.

A yet further embodiment of a kitchen machine according to the invention is characterized in that the second pivot axis is situated in a centerplane of the transmission and intersects the drive shaft. Since the second pivot axis is situated in the centerplane of the transmission and intersects the drive shaft, the influence of a slight tilting of the electric motor about the second pivot axis on the relative positions of the transmission components is a minimum.

A special embodiment of a kitchen machine according to the invention is characterized in that the first pivot axis is defined by two support ridges of the base on which the frame plate rests by means of two support elements. The use of the two support ridges and the two support elements provides the first pivot axis in a constructionally simple manner.

A further embodiment of a kitchen machine according to the invention, in which the first pivot axis is integrated in an elastic suspension construction of the frame plate and the electric motor, is characterized in that the support elements are each formed by an elastic suspension ring which is provided around two projections of the frame plate.

A yet further embodiment of a kitchen machine according to the invention is characterized in that the support ridges of the base have curved ends, a contact face between each support ridge and the relevant elastic suspension ring having a surface area which increases with an increase in the mechanical load acting on the frame plate. The use of the said support ridges achieves that the effective length of the elastic suspension rings is smaller in the case of large mechanical loads on the frame plate which occur, for example, when the kitchen machine is moved, transported, or dropped, than in the case of small mechanical loads on the frame plate. Thus a comparatively great stiffness of the suspension construction of the frame plate is achieved in the case of large mechanical loads on the frame plate, whereas a smaller stiffness of the suspension construction and a good damping of the vibrations caused by the electric motor are provided in the case of small mechanical loads on the frame plate.

A particular embodiment of a kitchen machine according to the invention, in which the second pivot axis is provided in a constructionally simple manner, is characterized in that the second pivot axis is defined by two recesses in the frame plate in which the frame pins are fastened to the frame plate with clearance.

A further embodiment of a kitchen machine according to the invention, in which the tilting possibility of the electric motor is limited in a constructionally simple manner, is characterized in that an end of at least one of the frame pins facing away from the frame plate is provided in a support bush of the motor housing, an elastic ring being present between the said end of the frame pin and the support bush of the motor housing.

A yet further embodiment of a kitchen machine according to the invention, in which the further tool may be coupled to a coupling shaft of the transmission extending parallel to the drive shaft and having its rotation bearings in a bearing bush, is characterized in that the bearing bush is provided in a support bush of the base, a further elastic ring being present between the bearing bush and the support bush of the base. The use of the said support bush and the further elastic ring provides a constructionally simple elastic support to the frame plate and the electric motor in the X- and Y-directions.

BRIEF DESCRIPTION OF THE DRAWINGS

The invention will be explained in more detail below with reference to the drawing in which.

DETAILED DESCRIPTION OF THE PREFERRED EMBODIMENTS

Figure 1:
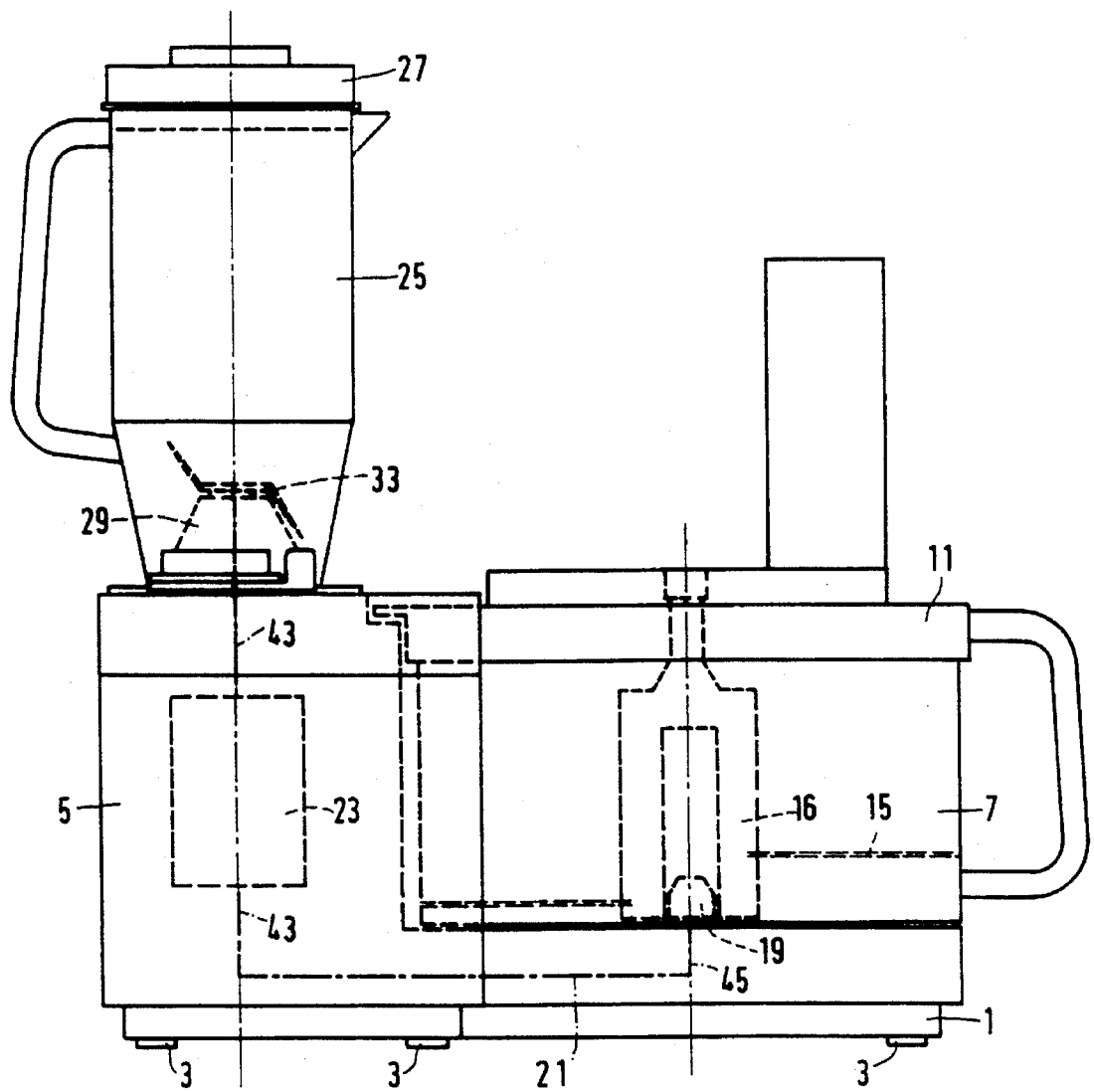
FIG. 1 is a front elevation of a kitchen machine according to the invention.

The kitchen machine shown in FIGS. 1 to 4 is provided with a base 1 of synthetic resin with a number of feet 3 with which the kitchen machine can be placed on a supporting surface. A motor housing 5 of synthetic resin is arranged on the base 1, next to which housing a transparent bowl 7 can be placed and locked on the base 1 by means of a bayonet catch 9 (see FIG. 2). The bowl 7 can be closed with a lid 11 which can be locked to the bowl 7 by means of a bayonet catch 13 (see FIG. 2).

A first tool is rotatable in the bowl 7, for example, a cutting tool 15, which can be exchanged after the lid 11 has been removed. A hollow shaft 16 of the cutting tool 15 is present with radial clearance around a central bush 17 of the bowl 7 visible in FIG. 2. When the bowl 7 is placed on the base 1, the cutting tool 15 is coupled to a first coupling bush 19 which can be driven by an electric motor 23 arranged in the motor housing 5 via a transmission 21 which is shown only diagrammatically in FIG. 1. When the bowl 7 is locked onto the base 1, the cutting tool 15 can align itself with the position of the coupling bush 19 owing to the said radial clearance, so that the centerline of the cutting tool 15 and the centerline of the coupling bush 19 are in one line after the bowl 7 has been locked.

Figure 2:
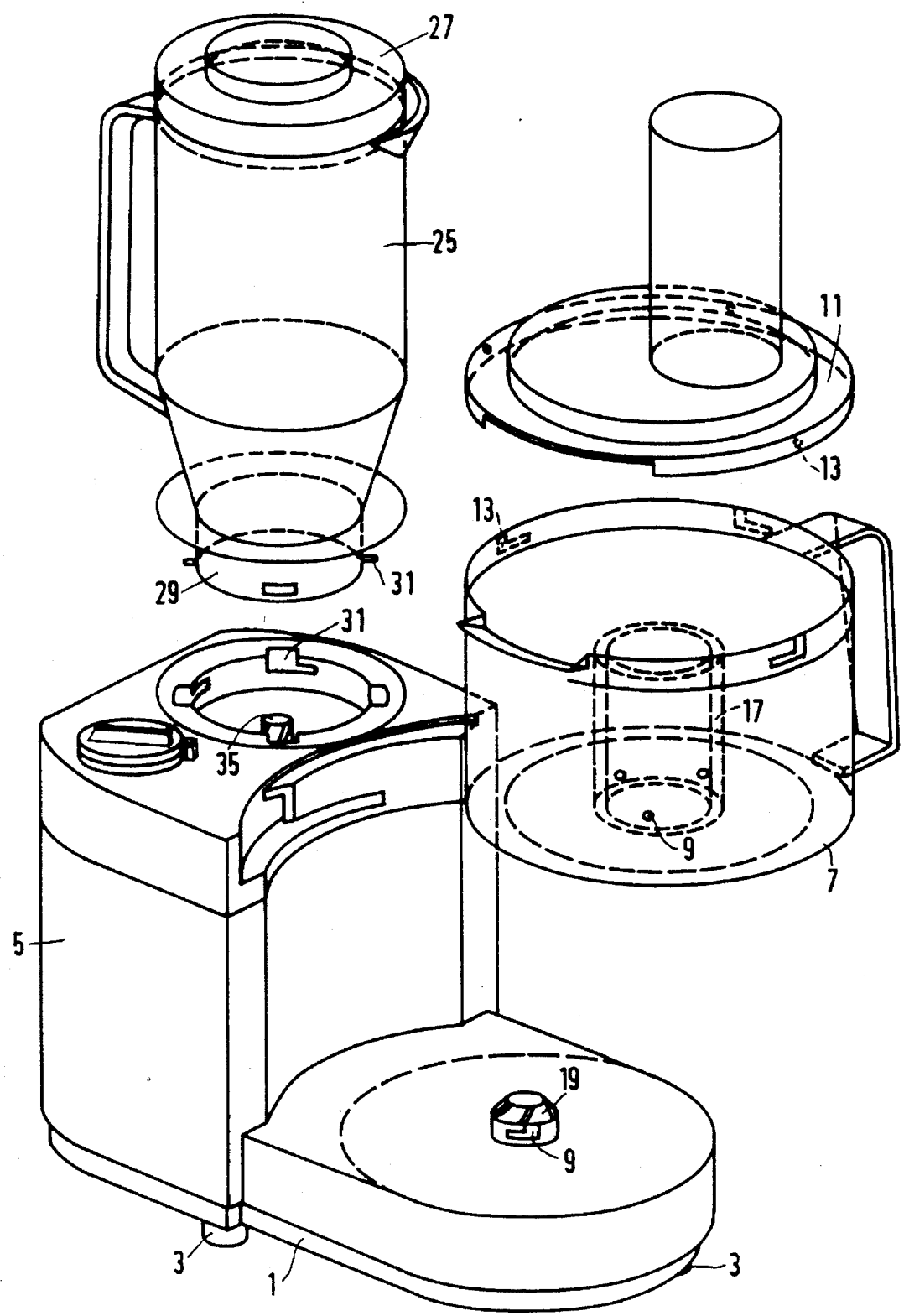
FIG. 2 shows the kitchen machine of FIG. 1 with a number of separate components.

As is visible in FIGS. 1 and 2, the kitchen machine is further provided with a transparent blender jar 25 with a lid 27 and a bottom portion 29 made of synthetic resin, which jar can be locked onto the motor housing 5 by means of a bayonet catch 31. A second tool, for example a metal blender tool 33, has its rotation bearings in the bottom portion 29 of the blender jar 25. In contrast to the cutting tool 15, the blender tool 33 is not exchangeable and has its bearings substantially without radial clearance in the bottom portion 29 of the blender jar 25. When the blender jar 25 is placed on the motor housing 5, the blender tool 33 is coupled to a second coupling bush 35 which is visible in FIG. 2 and which can also be driven by the electric motor 23.

Figure 3:
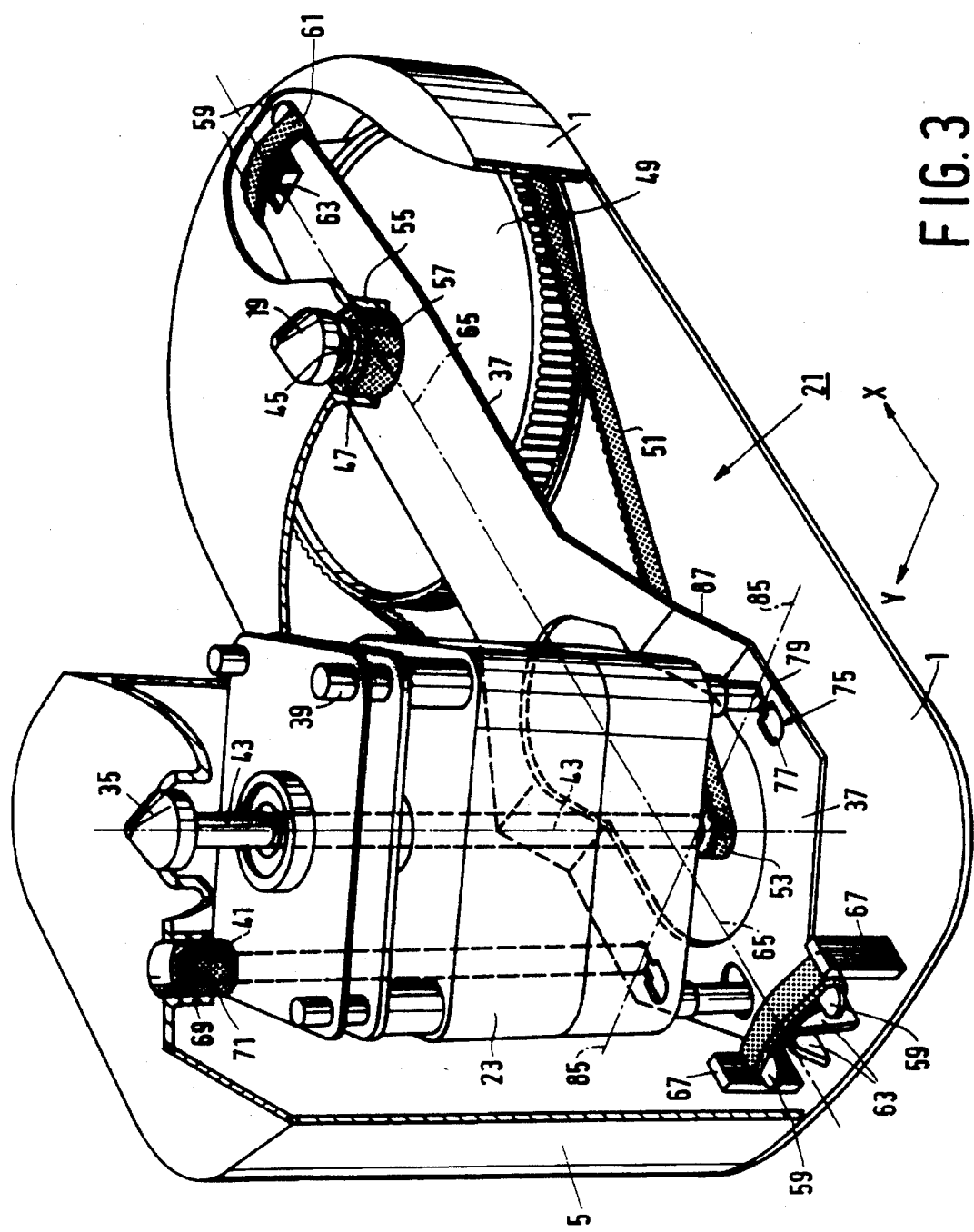
FIG. 3 shows a frame of the kitchen machine of FIG. 1.

As FIG. 3 shows, a frame plate 37 extends in the base 1, while two parallel frame pins 39 and 41 arranged in the motor housing 5, are fastened to the frame plate 37 in a manner yet to be described below, and extend transverse to the frame plate 37. The frame pin 41 is only partly visible in FIG. 3. The electric motor 23 is fastened to the frame pins 39 and 41. The second coupling bush 35 is fastened to an end of a drive shaft 43 extending transverse to the frame plate 37 and forming the motor shaft of the electric motor 23, while the first coupling bush 19 is fastened to an end of a coupling shaft 45 of the transmission 21 directed substantially parallel to the drive shaft 43. As is shown in FIG. 3, the coupling shaft 45 has its rotation support in a bearing bush 47 which is fastened to the frame plate 37. A sheave 49 is fastened to the end of the coupling shaft 45 remote from the first coupling bush 19, which sheave is coupled by means of a toothed belt 51 to a pinion 53 which is only partly visible in FIG. 3 and which is fastened to the end of the drive shaft 43 remote from the second coupling bush 35. Thus the cutting tool 15 and the blender tool 33 are simultaneously driven by the electric motor 23 during operation.

As FIG. 3 shows, the bearing bush 47 of the coupling shaft 45 is in a present support bush 55 of the base 1, a rubber ring 57 being provided between the support bush 55 and the bearing bush 47. The friction between the support bush 55 and the rubber ring 57 is such that the bearing bush 47 with the rubber ring 57 can be shifted in axial direction relative to the support bush 55. The use of the support bush 55 and the rubber ring 57 prevents displacements of the frame plate 37 relative to the base 1 parallel to an X-direction indicated in FIG. 3 and directed transverse to the drive shaft 43, and a Y-direction which is transverse to the X-direction and to the drive shaft 43.

Furthermore, the two ends of the frame plate 37 are each provided with two projections 59 around which an elastic rubber suspension ring 61 is provided. The frame plate 37 rests on two support ridges 63 forming part of the base 1 by means of the elastic suspension rings 61. As is visible in FIG. 3, the support ridges 63 each have a curved end. The use of the curved ends achieves that each contact face between the support ridges 63 and the elastic suspension rings 61 has a surface area which depends on the mechanical load acting on the frame plate 37 in a direction parallel to the drive shaft 43. When the said load increases, the surface area of the contact face increases as a result of elastic bending of the suspension rings 61, so that the effective length of the suspension rings 61 decreases and the mechanical stiffness of the suspension rings 61 increases. It is achieved in this manner that a comparatively slack suspension of the frame plate 37 is provided under normal operating conditions of the kitchen machine, when the mechanical load acting on the frame plate 37 is small, whereby a good damping of the vibrations caused by the electric motor 23 and a good noise insulation take place. In the case of a higher load, for example occurring when the kitchen machine is moved, transported, or dropped, on the other hand, a comparatively stiff suspension of the frame plate 37 is provided so that load fluctuations which may occur in the case of a high load on the frame cause a comparatively small elastic deformation of the suspension rings 61 and comparatively small displacements of the frame plate 37 relative to the base 1.

The use of the support ridges 63 and the suspension rings 61 further achieves that the frame plate 37, the frame pins 39 and 41, and the electric motor 23 are tiltable through small angles about a first pivot axis 65 directed parallel to the X-direction under slight elastic deformation of the rubber ring 57, so that the second coupling bush 35 of the drive shaft 43 is movable over small distances parallel to the Y-direction. As is further shown in FIG. 3, the base 1 comprises two projections 67 near one of the support ridges 63, preventing a rotation of the frame plate 37 about the centerline of the bearing bush 47.

As is further evident from FIG. 3, the ends of the frame pins 39 and 41 remote from the frame plate 37 are each accommodated in a support bush 69 of the motor housing 5. The support bush 69 of the frame pin 41 only is visible in FIG. 3. A ring 71 made of a soft type of rubber is provided between the said ends of the frame pins 39 and 41 and the support bushes 69, so that the said ends of the frame pins 39 and 41 are movable over small distances relative to the support bushes in a direction transverse to the drive shaft 43 under elastic deformation of the rings 71.

Figure 4:
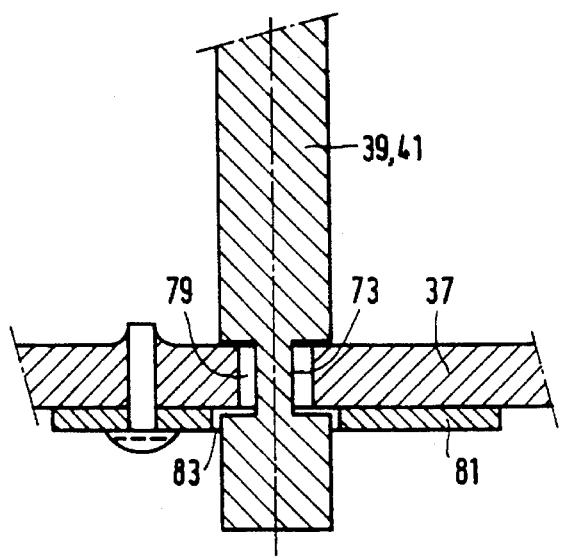
FIG. 4 is a cross-section of a recess in a frame plate of the frame according to FIG. 3, in which a frame pin of the frame is fastened to the frame plate with clearance.

As is shown in FIGS. 3 and 4, the ends of the frame pins 39 and 41 adjacent the frame plate 37 are provided with reduced portions 73 whose length is slightly greater than the thickness of the frame plate 37. The frame plate 37 is provided with two recesses 75 (see FIG. 3) which are each provided with a first portion 77, which has a width greater than the diameter of the frame pins 39 and 41 and which renders possible mounting of the frame pins 39 and 41 on the frame plate 37, and a second portion 79 in which the reduced portion 73 of the relevant frame pin 39, 41 is accommodated and which has a width which is smaller than the diameter of the frame pins 39 and 41 and greater than the diameter of the reduced portions 73. Furthermore, a retaining plate 81 is screwed on the frame plate 37 near each recess 75, which plate has a recess 83 which surrounds the end of the relevant frame pin 39, 41 with clearance (see FIG. 4). Thus the frame pins 39 and 41 are fastened to the frame plate 37 with a slight clearance, so that the electric motor 23 is tiltable relative to the frame plate 37 about a second pivot axis 85 indicated in FIG. 3 and directed parallel to the Y-direction. The second coupling bush 35 of the drive shaft 43 is accordingly movable over small distances parallel to the X-direction.

Since the second coupling bush 35 is movable both parallel to the X-direction and parallel to the Y-direction, it is achieved that the coupling bush 35 is self-aligning and can align itself relative to the position of the blender tool 33 when the blender jar 25 is placed and locked on the motor housing 5, the blender tool having a play-free bearing in the bottom portion 29 of the blender jar 25. It is achieved in this way that the centerline of the coupling bush 35 and the centerline of the blender tool 33 are in one line after locking, so that locking of the blender jar 25 onto the motor housing 5 takes place smoothly and the friction losses which may occur between the coupling bush 35 and the blender tool 33 during operation are reduced to a minimum.

As is further shown in FIG. 3, the frame plate 37 is provided with a stepped portion 87. The use of the stepped portion 87 achieves that the second pivot axis 85 is situated in a common centerplane of the sheave 49, toothed belt 51, and pinion 53. Furthermore, the frame pins 39 and 41 are so arranged relative to one another that the second pivot axis 85 intersects the drive shaft 43. It is achieved in this way that the second pivot axis 85 coincides substantially with a centerline of the pinion 53, so that the pinion 53 exclusively pivots about the said centerline when the electric motor 23 is pivoted about the second pivot axis 85. Thus a minimal change in the mutual positions of the sheave 49 and pinion 53 of the transmission 21 occurs when the electric motor 23 is tilted, so that the operation of the transmission 21 is scarcely affected. It is noted that a tilting of the frame plate 37 about the first pivot axis 65 does not affect the mutual positions of the sheave 49 and pinion 53. When the frame plate 37 is tilted about the first pivot axis 65, however, a slight displacement of the coupling shaft 45 relative to the base 1 does take place under elastic deformation of the rubber ring 57. The cutting tool 15 in the bowl 7 can then align itself relative to the position of the coupling shaft 45 thanks to the radial clearance between the central bush 17 of the bowl 7 and the shaft 16 of the cutting tool 15.

The kitchen machine described above comprises two attachments, i.e. the bowl 7 with the cutting tool 15 and the blender jar 25 with the blender tool 33. It is noted that the invention is also applicable to other types of kitchen machines which are provided with an attachment which can be placed on a motor housing of the kitchen machine, so that a rotatable tool of the attachment can be coupled to an end of a drive shaft of an electric motor arranged in the motor housing. An example which may be mentioned is the kitchen machine disclosed in British Patent Application GB-2,082, 713-A in which the attachment which is placed on the motor housing is a transverse arm with a rotatable beater. The invention may also be applied to kitchen machines which are provided with only one attachment having a rotatable tool, such as a blender jar with a blender tool.

It is further noted that the drive shaft 43 to which the blender tool 33 can be coupled in the kitchen machine described above is formed by the motor shaft of the electric motor 23. The invention, however, is also applicable to kitchen machines in which a transmission mechanism is arranged between the drive shaft and the motor shaft of the electric motor, by means of which mechanism the speed of the drive shaft is reduced compared with the speed of the motor shaft.

It is also noted that, instead of the construction described above in which the electric motor 23 is tillable about two pivot axes 65 and 85, an alternative construction may be used which provides an end 35 of the drive shaft 43 which can be displaced parallel to the X-direction and the Y-direction. Thus a construction may be used, for example, in which the electric motor 23 in its entirety is movable parallel to the X-direction and the Y-direction.

Finally, it is noted that the two pivot axes of the electric motor 23 may also be provided by means of an alternative construction, such as, for example, through the use of hinge pins, elastic hinges, or leaf springs.

We claim:

1. A kitchen machine with a motor housing on which an attachment with a rotatable tool is removably attachable, which tool is removably attachable to an end of a drive shaft which is drivable by an electric motor arranged in the motor housing, characterized in that the end of the drive shaft is self-aligning relative to the motor housing by means of a displacement parallel to an X-direction directed transverse to the drive shaft and a displacement parallel to a Y-direction which is transverse to the drive shaft and to the X-direction, whereby the end of the drive shaft aligns with the position of the tool when the attachment is attached.

2. A kitchen machine as claimed in claim 1, characterized in that the electric motor with the drive shaft is tiltable relative to the motor housing about a first pivot axis directed parallel to the X-direction and a second pivot axis directed parallel to the Y-direction.

3. A kitchen machine as claimed in claim 2, in which the motor housing is arranged on a base and the drive shaft extends transverse to the base, while a further attachment with a further tool is placable on the base, the further tool being rotatable about an axis of rotation directed parallel to the drive shaft and couplable to the drive shaft through a transmission arranged in the base, characterized in that the transmission is fastened to a frame plate which extends in the base and which is tiltable relative to the base about the first pivot axis, while the electric motor is fastened to two parallel frame pins which extend transverse to the frame plate and which are tiltable relative to the frame plate about the second pivot axis.

4. A kitchen machine as claimed in claim 3, characterized in that the second pivot axis is situated in a centerplane of the transmission and intersects the drive shaft.

5. A kitchen machine as claimed in claim 4, characterized in that the first pivot axis is defined by two support ridges of the base on which the frame plate rests by means of two support elements.

6. A kitchen machine as claimed in claim 5, characterized in that the support elements are each formed by an elastic suspension ring which is provided around two projections of the frame plate.

7. A kitchen machine as claimed in claim 6, characterized in that the support ridges of the base have curved ends, a contact face between each support ridge and the relevant elastic suspension ring having a surface area which increases with an increase in the mechanical load acting on the frame plate.

8. A kitchen machine as claimed in claim 4, characterized in that the second pivot axis is defined by two recesses in the frame plate in which the frame pins are fastened to the frame plate with clearance.

9. A kitchen machine as claimed claim 4, characterized in that an end of at least one of the frame pins facing away from the frame plate is provided in a support bush of the motor housing, an elastic ring being present between the said end of the frame pin and the support bush of the motor housing.

10. A kitchen machine as claimed in claim 4, in which the further tool is couplable to a coupling shaft of the transmission extending parallel to the drive shaft and having its rotation bearings in a bearing bush, characterized in that the bearing bush is provided in a support bush of the base, a further elastic ring being present between the bearing bush and the support bush of the base.

11. A kitchen machine as claimed in claim 5 wherein the second pivot axis is defined by two recesses in the frame plate in which the frame pins are fastened to the frame plate with clearance.

12. A kitchen machine as claimed in claim 6 wherein the second pivot axis is defined by two recesses in the frame plate in which the frame pins are fastened to the frame plate with clearance.

13. A kitchen machine as claimed in claim 7 wherein the second pivot axis is defined by two recesses in the frame plate in which the frame pins are fastened to the frame plate with clearance.

14. A kitchen machine as claimed in claim 5 wherein an end of at least one of the frame pins facing away from the frame plate is provided in a support bush of the motor housing, an elastic ring being present between the said end of the frame pin and the support bush of the motor housing.

15. A kitchen machine as claimed in claim 6 wherein an end of at least one of the frame pins facing away from the frame plate is provided in a support bush of the motor housing, an elastic ring being present between the said end of the frame pin and the support bush of the motor housing.

16. A kitchen machine as claimed in claim 7 wherein an end of at least one of the frame pins facing away from the frame plate is provided in a support bush of the motor housing, an elastic ring being present between the said end of the frame pin and the support bush of the motor housing.

17. A kitchen machine as claimed in claim 8 wherein an end of at least one of the frame pins facing away from the frame plate is provided in a support bush of the motor housing, an elastic ring being present between the said end of the frame pin and the support bush of the motor housing.

18. A kitchen machine as claimed in claim 5 wherein the further tool is couplable to a coupling shaft of the transmission extending parallel to the drive shaft and having its rotation bearings in a bearing bush, characterized in that the bearing bush is provided in a support bush of the base, a further elastic ring being present between the bearing bush and the support bush of the base.

19. A kitchen machine as claimed in claim 6 wherein the further tool is couplable to a coupling shaft of the transmission extending parallel to the drive shaft and having its rotation bearings in a bearing bush, characterized in that the bearing bush is provided in a support bush of the base, a further elastic ring being present between the bearing bush and the support bush of the base.

20. A kitchen machine as claimed in claim 7 wherein the further tool is couplable to a coupling shaft of the transmission extending parallel to the drive shaft and having its rotation bearings in a bearing bush, characterized in that the bearing bush is provided in a support bush of the base, a further elastic ring being present between the bearing bush and the support bush of the base.

21. A kitchen machine as claimed in claim 8 wherein the further tool is couplable to a coupling shaft of the transmission extending parallel to the drive shaft and having its rotation bearings in a bearing bush, characterized in that the bearing bush is provided in a support bush of the base, a further elastic ring being present between the bearing bush and the support bush of the base.

22. A kitchen machine as claimed in claim 9 wherein the further tool is couplable to a coupling shaft of the transmission extending parallel to the drive shaft and having its rotation bearings in a bearing bush, characterized in that the bearing bush is provided in a support bush of the base, a further elastic ring being present between the bearing bush and the support bush of the base.

* * * * *